(12) United States Patent
Yen et al.

(10) Patent No.: US 11,340,661 B2
(45) Date of Patent: May 24, 2022

(54) FOLDABLE ELECTRONIC DEVICE

(71) Applicant: SYNCMOLD ENTERPRISE CORP., New Taipei (TW)

(72) Inventors: Ching-Hui Yen, New Taipei (TW); Chien-Cheng Yeh, New Taipei (TW); Chun-Hao Huang, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 17/176,368

(22) Filed: Feb. 16, 2021

(65) Prior Publication Data

US 2021/0263565 A1 Aug. 26, 2021

Related U.S. Application Data

(60) Provisional application No. 62/979,151, filed on Feb. 20, 2020.

(30) Foreign Application Priority Data

Dec. 30, 2020 (TW) .................................. 109217318

(51) Int. Cl.
*G06F 1/16* (2006.01)
(52) U.S. Cl.
CPC .......... *G06F 1/1681* (2013.01); *G06F 1/1616* (2013.01); *G06F 1/1652* (2013.01)

(58) Field of Classification Search
CPC .............................. G06F 1/1652; G06F 1/1681
See application file for complete search history.

(56) References Cited

U.S. PATENT DOCUMENTS

| | | | | |
|---|---|---|---|---|
| 11,042,198 B2* | 6/2021 | Jan | ............................ | E05D 3/18 |
| 11,224,137 B2* | 1/2022 | Hsu | ............................ | E05D 3/18 |
| 11,229,133 B2* | 1/2022 | Kim | ..................... | H05K 5/0021 |
| 11,252,833 B2* | 2/2022 | Yen | ..................... | H05K 5/0017 |
| 11,262,793 B2* | 3/2022 | Hsu | ........................ | G06F 1/1681 |
| 2006/0238970 A1* | 10/2006 | Ukonaho | .............. | G06F 1/1681 |
| | | | | 361/679.01 |
| 2020/0166972 A1* | 5/2020 | Park | ....................... | G06F 1/1616 |
| 2020/0267245 A1* | 8/2020 | Li | .......................... | G06F 1/1652 |
| 2021/0096608 A1* | 4/2021 | Hallar | ................. | E05D 11/1028 |
| 2021/0333838 A1* | 10/2021 | Song | ..................... | G06F 1/1681 |
| 2021/0368032 A1* | 11/2021 | Liao | ..................... | H04M 1/022 |
| 2022/0035419 A1* | 2/2022 | Park | ....................... | G06F 1/1679 |
| 2022/0068167 A1* | 3/2022 | Park | ....................... | G06F 1/1616 |

* cited by examiner

*Primary Examiner* — Adrian S Wilson
(74) *Attorney, Agent, or Firm* — Muncy, Geissler, Olds & Lowe, P.C.

(57) ABSTRACT

A foldable electronic device is provided. The foldable electronic device comprises a central body, a first hinge module, a second hinge module, a first panel body, and a second panel body. When an external force is applied to rotate the first panel body or the second panel body about the first axis or the second axis, the first hinge module moves synchronously with second hinge module, the second panel body or the first panel body rotates correspondingly, and the first panel body and the second panel body are able to convert between an unfolded state and a folded state relative.

15 Claims, 7 Drawing Sheets

FOLDABLE ELECTRONIC DEVICE

CROSS REFERENCE TO RELATED APPLICATION

This application claims the benefit of U.S. Provisional Application Ser. No. 62/979,151, filed on Feb. 20, 2020, and the benefit of Taiwan Patent Application Serial No. 109217318, filed on Dec. 30, 2020. The entirety of each application is incorporated herein by reference.

BACKGROUND OF THE INVENTION

1. Field of the Invention

The present invention relates to a foldable electronic device, particularly a foldable electronic device with a flexible screen.

2. Description of Related Art

A foldable electronic device usually has a hinge module to achieve the function of rotating two panel bodies with respect to a central body. Specifically, in order to unfold or fold the electronic device, the user needs to apply an external force to make the hinge module operate and thus the flexible screen is in a flat or bent status correspondingly. In other words, current hinge modules cannot be unfolded or folded automatically.

The present invention provides a foldable electronic device. Through the assembly of a first stationary cam, a first gear member, and a first elastic member of a first hinge module and together with a combination of the first gear member and a second gear member of a second hinge module, the panel bodies can synchronously rotate and tend to be in an unfolded state or a folded state.

SUMMARY OF THE INVENTION

To achieve the objectives, the foldable electronic device comprises a central body, a first hinge module, a second hinge module, a first panel body, a second panel body, and a flexible screen. The first hinge module includes a first shaft, a first stationary cam, a first gear member, and a first elastic member, wherein the first shaft is disposed on the central body and has a first shaft body; the first shaft body extends along a first axis; the first stationary cam is sleeved on the first shaft body and is fixed to the central body; the first gear member is sleeved on the first shaft body and is matched with the first stationary cam, and the first gear member is slidable along the first axis; the first elastic member abuts between the first shaft and the first gear member, and constantly provides a first elastic force to the first gear member. On the other hand, the second hinge module includes a second shaft and a second gear member, wherein the second shaft is disposed on the central body and is parallel to the first shaft, and the second shaft has a second shaft body; the second shaft body extends along a second axis; the second gear member is sleeved on the second shaft body and is engaged with the first gear member, and the second gear member is slidable along the second axis. The first panel body is connected to the first gear member and is rotatable relative to the central body. The second panel body is connected to the second gear member and is rotatable relative to the central body. The flexible screen is disposed on the first panel body and the second panel body. When an external force is applied to the first panel body or the second panel body to rotate the first panel body or the second panel body about the first axis or the second axis, the first gear member or the second gear member rotates correspondingly, and the second gear member or the first gear member rotates synchronously, thereby leading the second panel body or the first panel body to rotate about the second axis or the first axis and making the first panel body and the second panel body be able to convert between an unfolded state and a folded state relative to each other so that the flexible screen is correspondingly flattened or bent. Furthermore, the first elastic force provided by the first elastic member changes as the first gear member rotates with the first panel body and slides along the first axis relative to the first stationary cam, and the first panel body and the second panel body tend to be in the unfolded state or the folded state.

The first gear member has a first gear and a first motion cam, wherein the first motion cam is fixed to the first gear and is adapted to assemble with the first stationary cam. The second gear member has a second gear engaging with the first gear.

The first motion cam has a first sliding spiral surface, the first stationary cam has a first positioning spiral surface, and the first sliding spiral surface is slidably contacted with the first positioning spiral surface. As the first sliding spiral surface slides relative to the first positioning spiral surface and the first motion cam slides on the first shaft along the first axis and away from the first stationary cam, and then the first gear compresses the first elastic member.

The first stationary cam leads the first elastic member makes the first gear member tend to slide toward the first stationary cam so that the first panel body and the second panel body tend to be in the unfolded state.

The first elastic member tends to lead the first motion cam rotating counterclockwise to close the first stationary cam in a viewing direction from the first elastic member toward the first stationary cam.

When the first panel body and the second panel body are in the folded state by the external force, the flexible screen is bent, and the first elastic member is compressed by the first gear. However, when the external force is removed, the first elastic member is released so that the first gear, the first motion cam, and the second gear slide axially toward the first stationary cam by the first elastic force and thus the first panel body and the second panel body are converted to the unfolded state.

The first shaft further includes a first connecting body that is sleeved on the first shaft body and is fixed to the first panel body. Also, the second shaft further includes a second connecting body that is sleeved on the second shaft body and is fixed to the second panel body.

The first elastic member abuts between the first gear and the first connecting body.

The first shaft body and the second shaft body are respectively provided with a truncated edge section of the first gear member, the first connecting body, the second gear member and the second connecting body respectively have a plurality of axial holes, and wherein each of the axial holes respectively has a cross section matched with a cross section of the truncated edge section.

A direction of rotation of the first gear member is opposite to a direction of a rotation of the second gear member rotate while rotating.

The first hinge module and the second hinge module are disposed in a receiving space of the central body.

The second hinge module further includes a second stationary cam and a second elastic member, wherein the second stationary cam is sleeved on the second shaft body and fixed to the central body; the second elastic member abuts between the second shaft and the second gear member, and constantly provides a second elastic force to the second gear member. The second elastic force provided by the second elastic member changes as the second panel body rotates about the second axis as its axis and drives the second gear member to rotate correspondingly and to slide along the second axis relative to the second stationary cam.

The second gear member has a second motion cam. The second motion cam is fixed to the second gear and is adapted to assemble with the second stationary cam. The second elastic member makes the second gear member tending to slide towards the second stationary cam.

The second motion cam has a second sliding spiral surface, the second stationary cam has a second positioning spiral surface, and the second sliding spiral surface is slidably contacted with the second positioning spiral surface. As the second sliding spiral surface slides relative to the second positioning spiral surface and the second motion cam slides on the second shaft along the second axis and away from the second stationary cam, and then the second gear compresses the second elastic member.

The second elastic member abuts between the second gear and the second connecting body. When the first panel body and the second panel body are in the folded state relative to each other by the external force, the flexible screen is bent, and the second elastic member is compressed by the second gear. On the other hand, when the external force is removed, the second elastic member is released so that the second motion cam slides axially toward the second stationary cam by the second elastic force and thus the first panel body and the second panel body are converted to the unfolded state.

DETAILED DESCRIPTION OF THE PREFERRED EMBODIMENT

Figure 1:
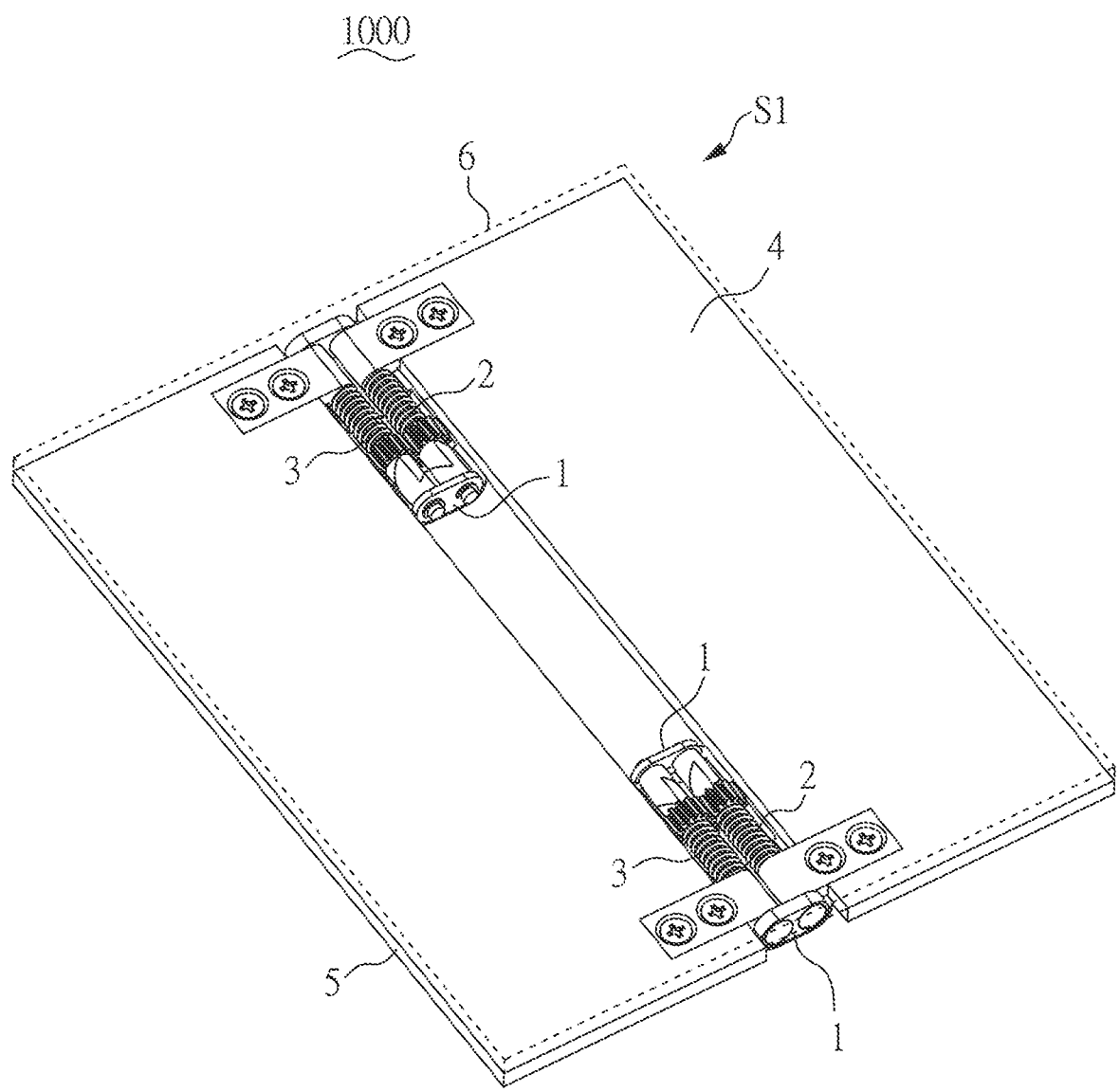
FIG. 1 is a perspective schematic view showing a foldable electronic device in an unfolded state of the present invention.

FIG. 1 illustrates a foldable electronic device 1000 comprising two central bodies 1, two first hinge modules 2, two second hinge modules 3, a first panel body 4, a second panel body 5, a flexible screen 6, and a buckle 7. Each first hinge module 2 and each second hinge module 3 are disposed in each central body 1, and the first hinge module 2 is connected to the second hinge module 3 correspondingly. The first panel body 4, which moves synchronously with the first hinge module 2, is adapted to rotate with respect to the central body 1. Also, the second panel body 5, which moves synchronously with the second hinge module 3, is adapted to rotate with respect to the central body 1. The flexible screen 6 is disposed on the first panel body 4 and the second panel body 5. As an example, in the following paragraphs, only one set of the central bodies 1, the first hinge modules 2, and the second hinge modules 3 will be described in relation to the assembly and operation with other components.

Figure 2:
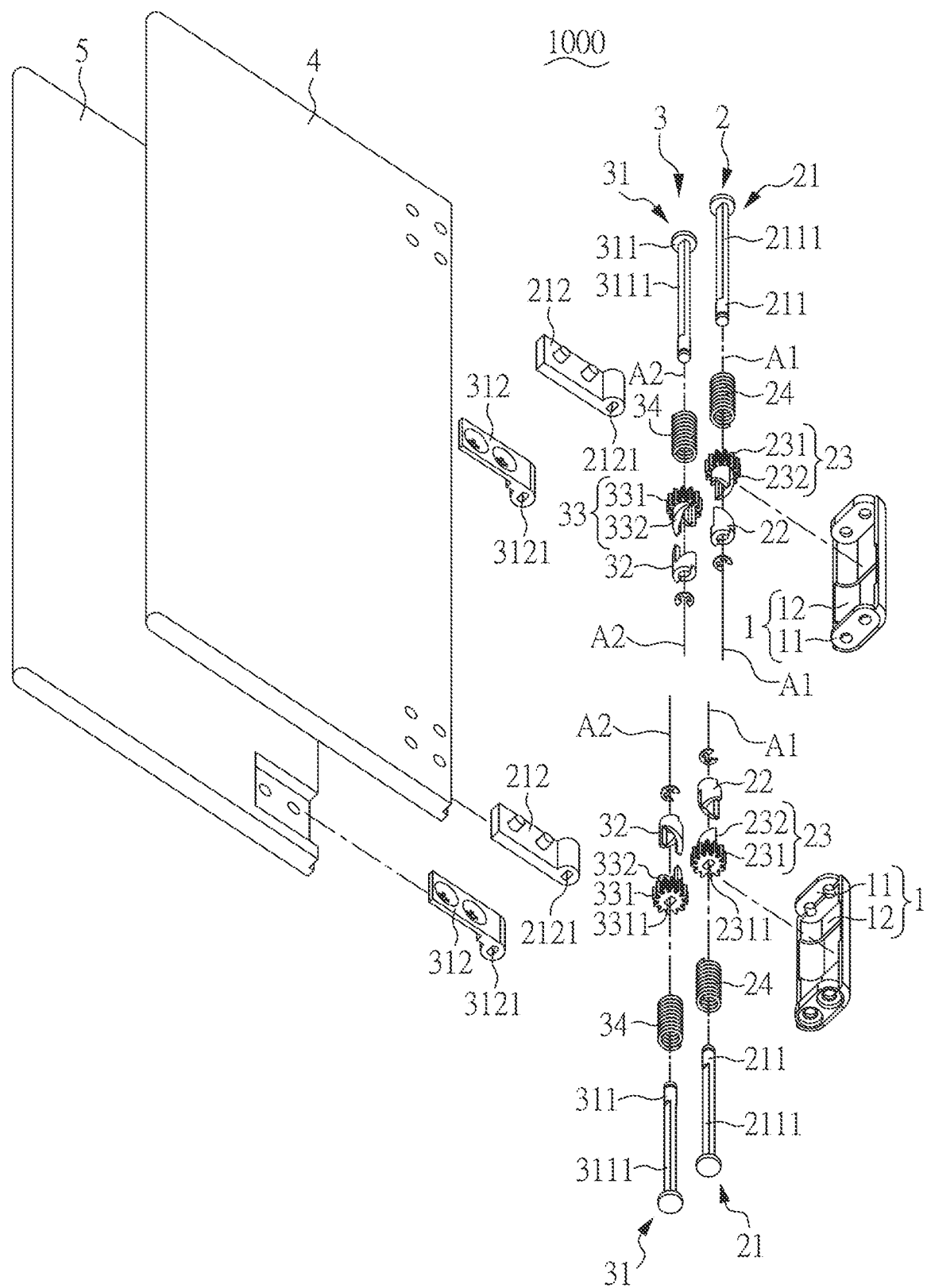
FIG. 2 is an exploded view showing a foldable electronic device of the present invention.
Figure 5:
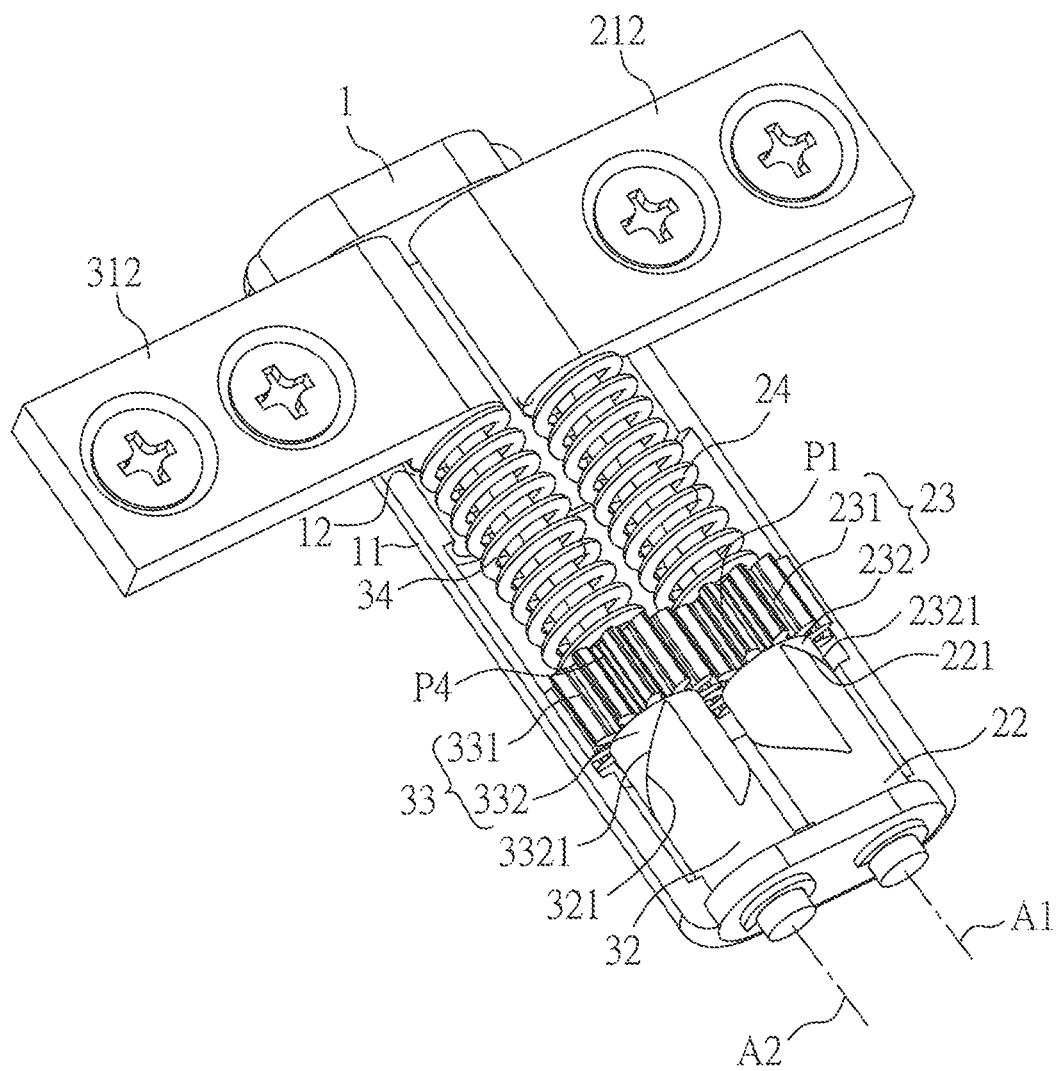
FIG. 5 is a schematic diagram showing an operation of the first hinge module and the second hinge in an unfolded state of the present invention.

In view of FIGS. 1, 2, and 5, the central body 1 includes a housing 11 and a receiving space 12, wherein the receiving space 12 is defined by the housing 11. The first hinge module 2 includes a first shaft 21, a first stationary cam 22, a first gear member 23, and a first elastic member 24. Moreover, the first shaft 21 has a first shaft body 211 and a first connecting body 212, wherein the first shaft body 211 extends along a first axis A1 and is pivotally disposed on the housing 11 of the central body 1, and specifically, the first shaft body 211 is disposed in the receiving space 12. Besides, the first shaft body 211 has a truncated edge section 2111, which has a D-shaped cross-section. The first connecting body 212 is sleeved on the first shaft body 211 and is fixed to the first panel body 4, and an axial hole 2121 of the first connecting body 212 is provided with a cross section that matches with a cross section of the truncated edge section 2111. Furthermore, the first stationary cam 22 is sleeved on the first shaft body 211, is fixed to the housing 11 of the central body 1, and has a first positioning spiral surface 221. The first gear member 23 is sleeved on the first shaft body 211 and is adapted to slide on the first shaft body 211 along the first axis A1 between a first engaging position P1 and a first abutting position P3. Moreover, the first gear member 23 has a first gear 231 and a first motion cam 232, wherein an axial hole 2311 of the first gear 231 is provided with a cross section that matches with a cross section of the truncated edge section 2111. The first motion cam 232 is fixed to the first gear 231 and has a first sliding spiral surface 2321, wherein the first sliding spiral surface 2321 is slidably and is able to contact with the first positioning spiral surface 221. The first elastic member 24 abuts between the first gear member 231 and the first connecting body 212. The first elastic member 24 constantly provides a first elastic force to the first gear member 23.

Similarly, the second hinge module 3 includes a second shaft 31, a second stationary cam 32, a second gear member 33, and a second elastic member 34. The second shaft 31 being parallel to the first shaft 21 includes a second shaft body 311 and a second connecting body 312. The second shaft body 311 extends along a second axis A2 and has a truncated edge section 3111. The second shaft body 311 is pivotally disposed on the housing 11 of the central body 1, and specifically, the second shaft body 311 is disposed in the receiving space 12 and is parallel to the first shaft body 211 (i.e. the second axis A2 is parallel to the first axis A1). The second connecting body 312 is sleeved on the second shaft body 311 and is fixed to the second panel body 5, wherein an axial hole 3121 of the second connecting body 312 is provided with a cross section that matches with a cross section of the truncated edge section 3111. Also, the second stationary cam 32 is sleeved on the second shaft body 311, is fixed to the housing 11 of the central body 1, and has a second positioning spiral surface 321. The second gear member 33 is sleeved on the second shaft body 311 and is adapted to slide on the second shaft body 311 along the second axis A2 between a second engaging position P4 and a second abutting position P6. Moreover, the second gear member 33 has a second gear 331 and a second motion cam 332, wherein the second gear 331 is engaged with the first gear 231, and an axial hole 3311 of the second gear 331 is provided with a cross section that matches with a cross section of the truncated edge section 3111. The second motion cam 332 is fixed to the second gear 331 and has a second sliding spiral surface 3321, wherein the second sliding spiral surface 3321 is slidably contacted with the second positioning spiral surface 321. The second elastic member 34 abuts between the second gear member 331 and the second connecting body 312, and constantly provides a second elastic force to the second gear member 33.

The operation of the foldable electronic device 1000 of the present invention is described as followed. When an external force is applied, the status of the first panel body 4 and the second panel body 5 are converted between an unfolded state S1 (see FIGS. 1 and 5) and a folded state S2 (see FIGS. 4 and 7). Meanwhile, the first gear member 23 slides on the first shaft body 211 between the first engaging position P1 and the first abutting position P3 while the second gear member 33 slides on the second shaft body 311 between the second engaging position P4 and the second abutting position P6.

As shown in FIGS. 1 and 5, the first elastic member 24 makes the first gear member 23 tend to slide toward the first stationary cam 22 and finally stop at the first engaging position P1, and the first sliding spiral surface 2321 completely overlaps the first positioning spiral surface 221. Similarly, the second elastic member 34 makes the second gear member 33 tend to slide toward the second stationary cam 32 and finally stop at the second engaging position P4, and the second sliding spiral surface 3321 completely overlaps the second positioning spiral surface 321. Hence, the first panel body 4 and the second panel body 5 tend to be in the unfolded state S1 while the flexible screen 6 is correspondingly flattened.

Hereinafter, as an example, an external force is applied to the first panel body 4 to convert the first panel body 4 and the second panel body 5 from the unfolded state S1 to the folded state S2. At this time, the first panel body 4 rotates about the first axis A1 and drives the first connecting body 212 and the first shaft body 211 to rotate about the first axis A1, which results in the corresponding rotation of the first gear 231, and drives the second gear 331 (the rotation directions of the first gear 231 and the second gear 331 are opposite to each other). Then, the second shaft body 311 and the second connecting body 312 rotate about the second axis A2 due to the rotation of the second gear 331, so that the second panel body 5 rotates about the second axis A2 with respect to the central body 1. As the first gear 231 rotates, the first motion cam 232 is driven to rotate about the first axis A1 and slide on the first shaft body 211 with respect to the first stationary cam 22, and then the first sliding spiral surface 2321 gradually moves away from the first positioning spiral surface 221. While the first motion cam 232 drives the first gear 231 to slide axially on the first shaft body 211 and gradually compress the first elastic member 24, the first elastic force provided by the first elastic member 24 changes. Meanwhile, the first gear 231 drives the second gear 331 to rotate, too. Then, the second gear 331 drives the second motion cam 332 to displace relative to the second stationary cam 32, and the second sliding spiral surface 3321 gradually moves away from the second positioning spiral surface 321. The second motion cam 332 enables the second gear 331 to slide axially on the second shaft body 311 and gradually compress the second elastic member 34, which in turn causes a change in the second elastic force provided by the second elastic member 34.

Figure 3:
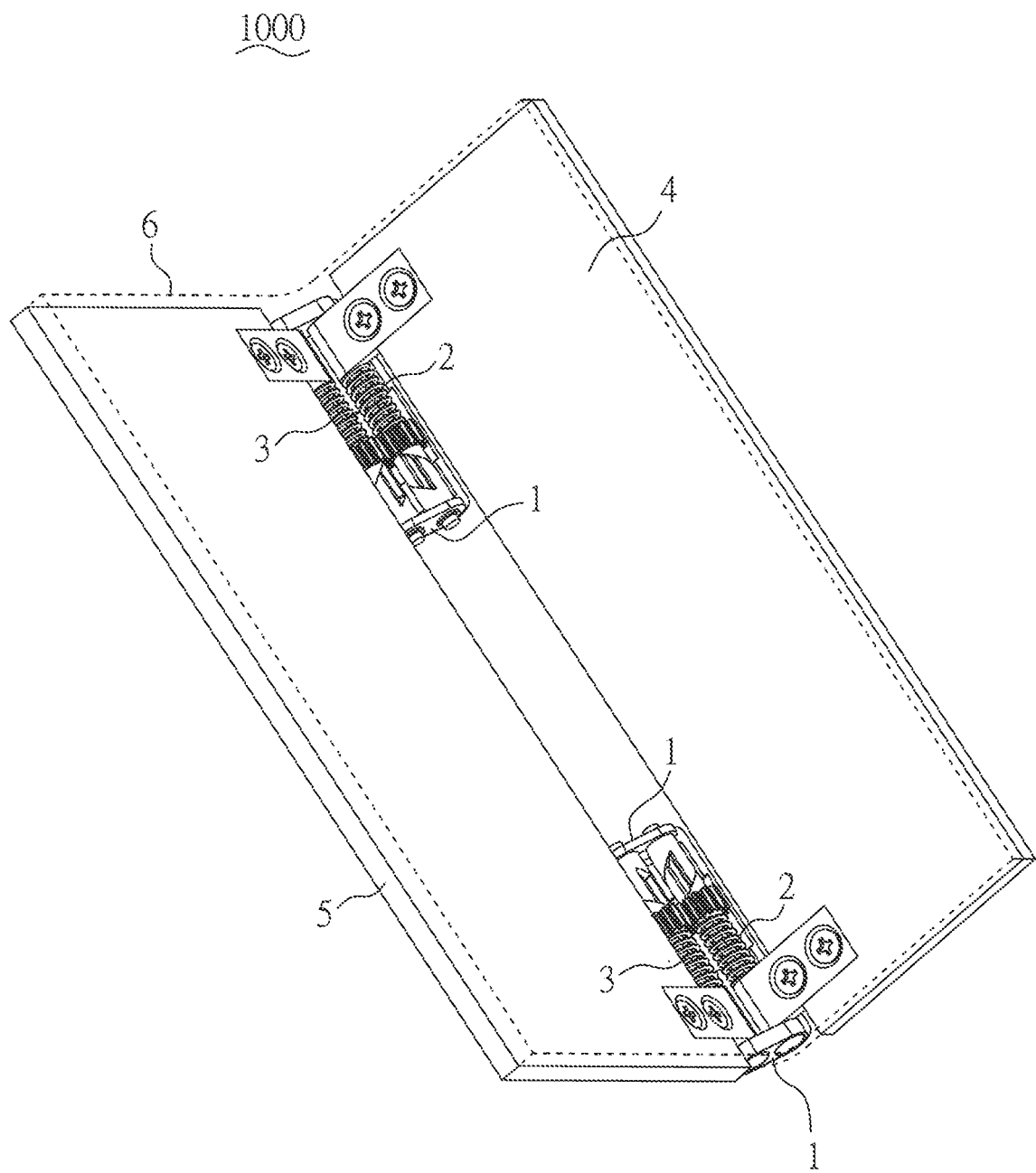
FIG. 3 is a perspective schematic view showing a foldable electronic device in a partially unfolded state of the present invention.
Figure 6:
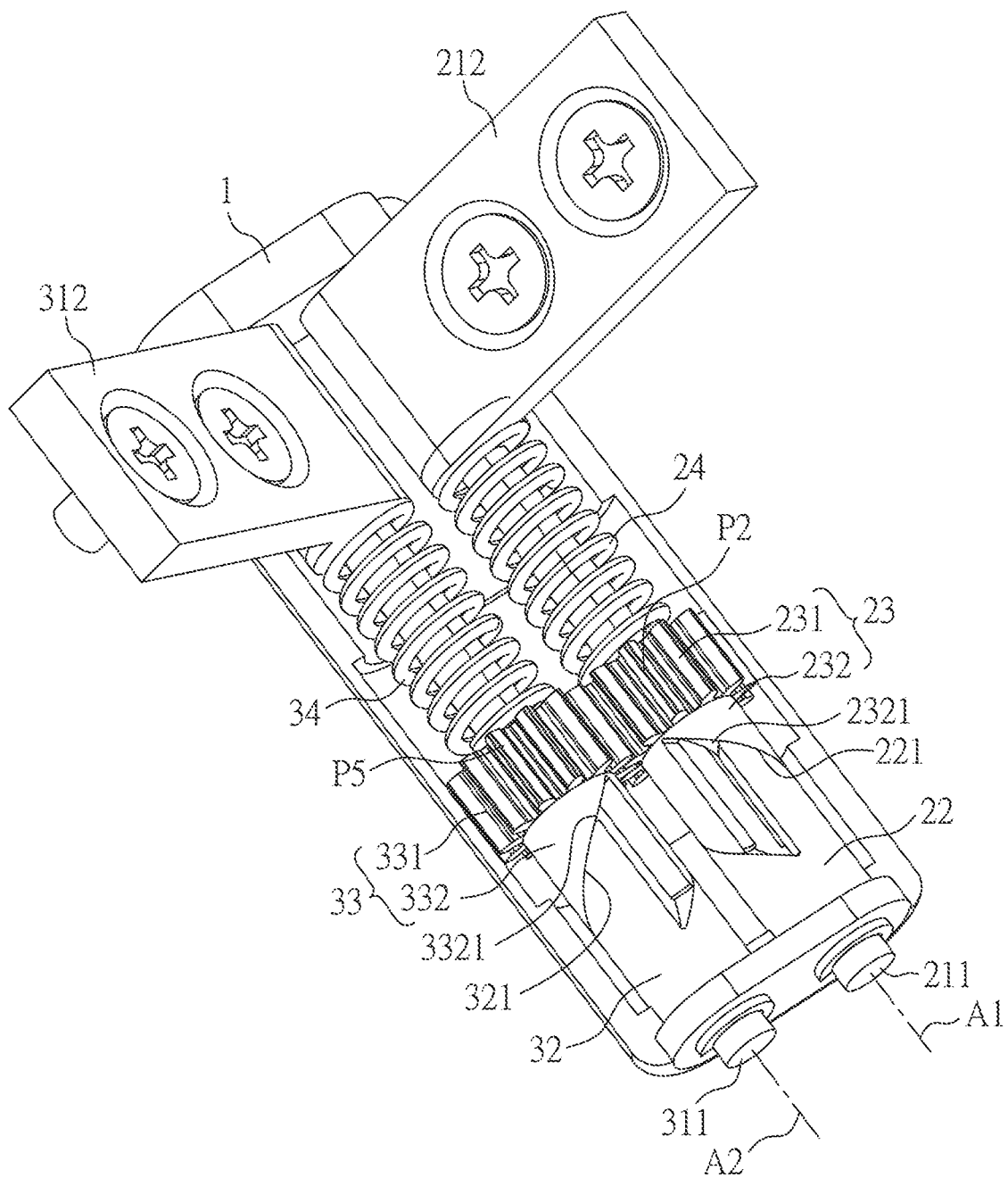
FIG. 6 is a schematic diagram showing an operation of the first hinge module and the second hinge in a partially unfolded state of the present invention.

As shown in FIGS. 3 and 6, with the above actions, when the first panel body 4 and the second panel body 5 rotate until an included angle between the first panel body 4 and the second panel body 5 is 90 degrees (i.e., the included angle between the first connecting body 212 and the second connecting body 312 is about 90 degrees), the first gear member 23 moves to a first intermediate position P2 while the first sliding spiral surface 2321 is partially away from the first positioning spiral surface 221, and the first elastic member 24 is slightly compressed by the first gear member 23. On the other hand, the second gear member 33 moves to a second intermediate position P5 while the second sliding spiral surface 3321 is partially away from the second positioning spiral surface 321, and the second elastic member 34 is slightly compressed by the second gear member 33. At this time, the flexible screen 6 is in a partially bent position.

Figure 4:
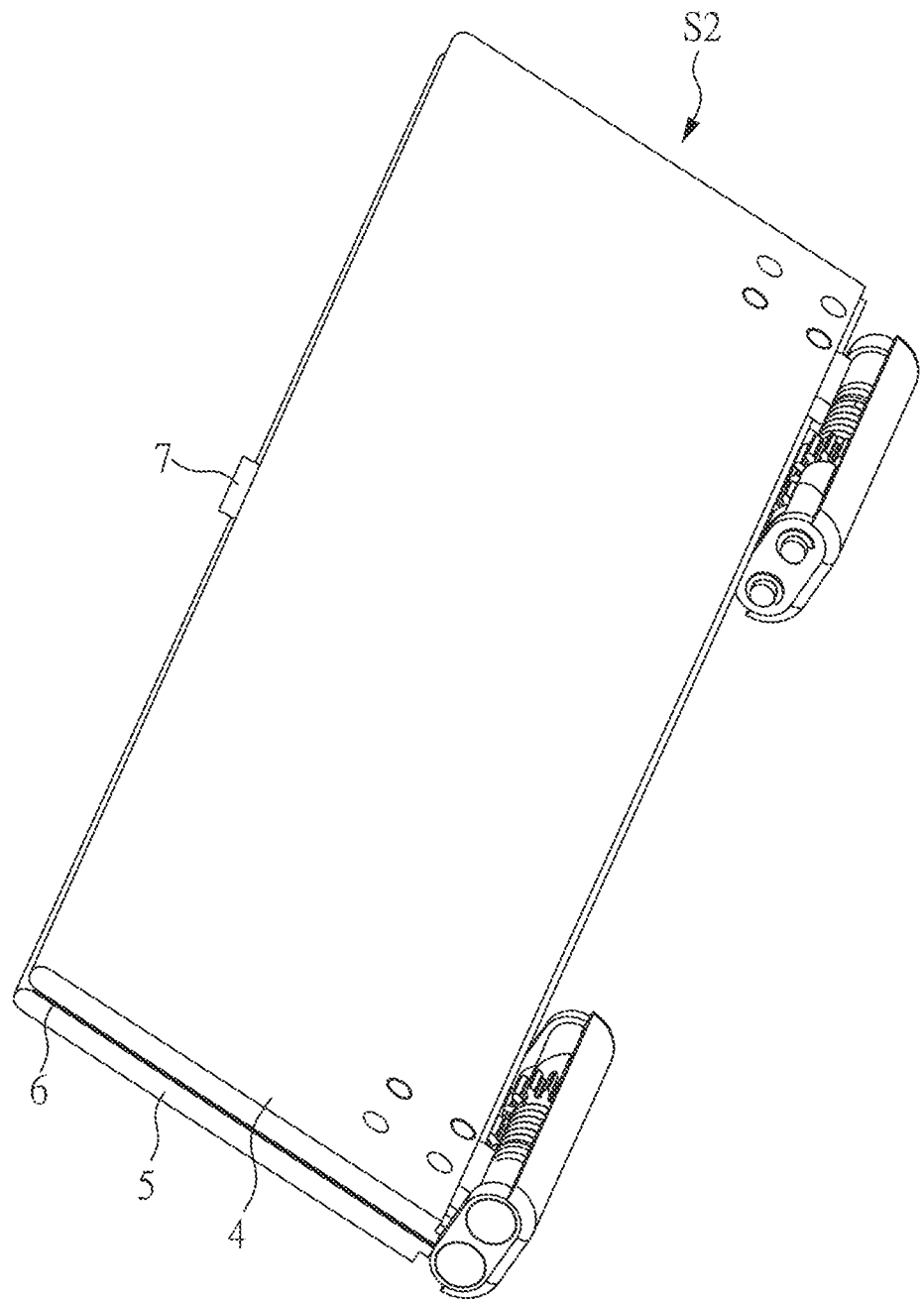
FIG. 4 is a perspective schematic view showing a foldable electronic device in a folded state of the present invention.
Figure 7:
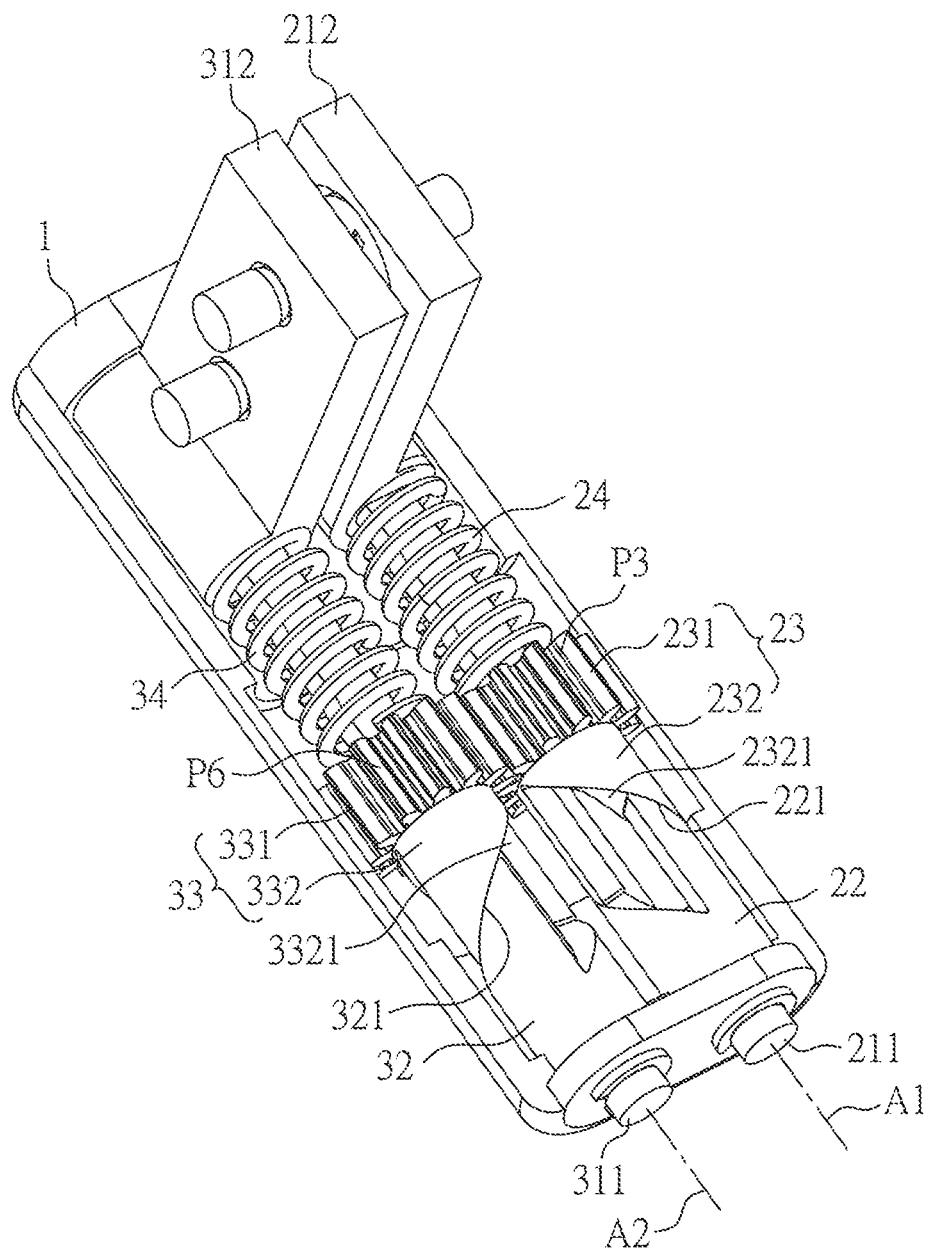
FIG. 7 is a schematic diagram showing an operation of the first hinge module and the second hinge in a folded state of the present invention.

Turning to FIGS. 4 and 7, upon continuously applying the external force until the first panel body 4 and the second panel body 5 are converted to the folded state S2, the first motion cam 232 moves from the first intermediate position P2 to the first abutting position P3 while the first sliding spiral surface 2321 contacts with the first positioning spiral surface 221 only for a small area. Meanwhile, the second motion cam 332 moves from the second intermediate position P5 to the second abutting position P6 while the second sliding spiral surface 3321 only contacts with the second positioning spiral surface 321 for a small area, too. At this time, the flexible screen 6 is bent.

In this embodiment, the first sliding spiral surface 2321 and the first positioning spiral surface 221 are designed to be outward turning surfaces. That is, the first elastic member 24 tends to lead the first motion cam 232 to rotate counterclockwise to close the first stationary cam 22 in a viewing direction from the first elastic member 24 toward the first stationary cam 22. Similarly, the second sliding spiral surface 3321 and the second positioning spiral surface 321 are designed to be outward turning surfaces as well, that is, the second elastic member 34 tends to lead the second motion cam 332 to rotate clockwise to close the second stationary cam 32 in a viewing direction from the second elastic member 34 toward the second stationary cam 32. As a result, the first panel body 4 and the second panel body 5 tend to be in the unfolded state S1. When the first panel body 4 and the second panel body 5 are converted to the folded state S2 by the external force, the first panel body 4 and the second panel body 5 can be buckled together by the buckle 7 (as shown in FIG. 4) to keep the panel bodies in the folded state S2. On the other hand, when the buckle 7 is unbuckled, the first elastic member 24 and the second elastic member 34 simultaneously release the first elastic force and the second elastic force to push the first gear member 23 and the second gear member 33 to approach the first stationary cam 22 and the second stationary cam 32, respectively. As a result, the first sliding spiral surface 2321 and the first positioning spiral surface 221 are completely rejoined again while the second sliding spiral surface 3321 and the second positioning spiral surface 321 are completely rejoined as well, resulting in that the first panel body 4 and the second panel body 5 automatically convert back to the unfolded state S1 (as shown in FIG. 1). In addition, the first motion cam 232 and the first stationary cam 22 are limited to each other, and the second motion cam 332 and the second stationary cam 32 are limited to each other. Hence, situations such as over-turning will be avoided.

The above description is an example illustrating if the first panel body 4 rotates about the first axis A1 by the external force. However, it is also possible for the user to apply the external force to the second panel body 5 to rotate it about the second axis A2. In this case, the second shaft 31 drives the second gear member 33 to rotate and to slide along the second shaft body 311. The second gear member 33 also drives the first gear member 23 to rotate, and eventually drives the first panel body 4 to synchronously rotate about the first axis A1 to convert from the unfolded state S1 to the folded state S2. The operation of each component will not be discussed here.

It should be noted that in other embodiments of the present invention, the second gear member 33 of the second hinge module 3 may only comprise the second gear 331. Namely, the second motion cam 332, the second stationary cam 32, and the second elastic member 34 can be omitted. The synchronized rotation of the first panel body 4 and the second panel body 5 can still be achieved by a combination of the first gear 231 and the second gear 331, the first stationary cam 22 and the first motion cam 232, and the elastic force of the first elastic member 24.

Alternatively, in other embodiments, the first panel body 4 and the second panel body 5 may tend to be in the folded state S2. Specifically, if the first sliding spiral surface 2321 and the first positioning spiral surface 221 are designed to be internal spinning surfaces, that is, the first elastic member 24 tends to lead the first motion cam 232 to rotate clockwise to close the first stationary cam 22 in a viewing direction from the first elastic member 24 toward the first stationary cam 22. Also, the second sliding spiral surface 3321 and the second positioning spiral surface 321 are designed to be internal spinning surfaces as well, which means that the second elastic member 34 tends to lead the second motion cam 332 to rotate counterclockwise to close the second stationary cam 32 in a viewing direction from the second elastic member 34 toward the second stationary cam 32. As a result, the first panel body 4 and the second panel body 5 tend to be in the folded state S2. When the first panel body 4 and the second panel body 5 are in the unfolded state S1, the first gear member 23 is at the first abutting position P3 corresponding to the first shaft body 211, and the second gear member 33 is on the second shaft body 311 at the first abutting position P6. By contrast, when the first panel body 4 and the second panel body 5 are in the folded state S2, the first gear member 23 is at the first engaging position P1 corresponding to the first shaft body 211, and the second gear member 33 is on the second shaft body 311 at the second engaging position P4.

What is claimed is:

1. A foldable electronic device, comprising:
  a central body;
  a first hinge module including:
    a first shaft disposed on the central body and having a first shaft body extending along a first axis;
    a first stationary cam sleeved on the first shaft body and fixed to the central body;
    a first gear member sleeved on the first shaft body and matched with the first stationary cam, wherein the first gear member is slidable along the first axis; and
    a first elastic member abutting between the first shaft and the first gear member, and constantly providing a first elastic force to the first gear member;
  a second hinge module including:
    a second shaft disposed on the central body and being parallel to the first shaft, wherein the second shaft has a second shaft body extending along a second axis; and
    a second gear member sleeved on the second shaft body and engaged with the first gear member, wherein the second gear member is slidable along the second axis;
  a first panel body connected to the first gear member and being pivotable relative to the central body;
  a second panel body connected to the second gear member and being pivotable relative to the central body; and
  a flexible screen disposed on the first panel body and the second panel body;
  wherein when an external force is applied to rotate the first panel body or the second panel body about the first axis or the second axis, the first gear member or the second gear member rotates correspondingly, and the second gear member or the first gear member rotates synchronously, thereby leading the second panel body or the first panel body to rotate about the second axis or the first axis and making the first panel body and the second panel body be able to convert between an unfolded state and a folded state so that the flexible screen is correspondingly flattened or bent;
  wherein the first elastic force provided by the first elastic member changes as the first gear member rotates with the first panel body and slides along the first axis relative to the first stationary cam, and the first panel body and the second panel body tend to be in the unfolded state or the folded state.

2. The foldable electronic device as claimed in claim 1, wherein the first gear member has a first gear and a first motion cam, the first motion cam is fixed to the first gear and is adapted to assemble with the first stationary cam, and the second gear member has a second gear engaging with the first gear.

3. The foldable electronic device as claimed in claim 2, wherein the first motion cam has a first sliding spiral surface, the first stationary cam has a first positioning spiral surface, and the first sliding spiral surface is slidably contacted with the first positioning spiral surface, and wherein as the first sliding spiral surface slides relative to the first positioning spiral surface and the first motion cam slides on the first shaft along the first axis and away from the first stationary cam, the first gear compresses the first elastic member.

4. The foldable electronic device as claimed in claim 3, wherein the first elastic member makes the first gear member tend to slide toward the first stationary cam so that the first panel body and the second panel body tend to be in the unfolded state.

5. The foldable electronic device as claimed in claim 4, wherein the first elastic member tends to lead the first motion cam rotating counterclockwise to close the first stationary cam in a viewing direction from the first elastic member toward the first stationary cam.

6. The foldable electronic device as claimed in claim 5, wherein when the first panel body and the second panel body are in the folded state by the external force, the flexible screen is bent, and the first elastic member is compressed by the first gear, and when the external force is removed, the first elastic member is released so that the first gear, the first motion cam, and the second gear slide axially toward the first stationary cam by the first elastic force, and thus the first panel body and the second panel body are converted to the unfolded state.

7. The foldable electronic device as claimed in claim 6, wherein the first shaft further includes a first connecting body sleeved on the first shaft body and fixed to the first panel body, and the second shaft further includes a second connecting body sleeved on the second shaft body and fixed to the second panel body.

8. The foldable electronic device as claimed in claim 7, wherein the first elastic member abuts between the first gear and the first connecting body.

9. The foldable electronic device as claimed in claim 8, wherein the first shaft body and the second shaft body are respectively provided with a truncated edge section, of the first gear member, the first connecting body, the second gear member and the second connecting body respectively have a plurality of axial holes, and wherein each of the axial holes respectively has a cross section matched with a cross section of the truncated edge section.

10. The foldable electronic device as claimed in claim 1, wherein a direction of rotation of the first gear member is opposite to a direction of rotation of the second gear member rotate while rotating.

11. The foldable electronic device as claimed in claim 1, wherein the first hinge module and the second hinge module are disposed in a receiving space of the central body.

12. The foldable electronic device as claimed in claim 2, wherein the second hinge module further includes:
a second stationary cam sleeved on the second shaft body and fixed to the central body; and
a second elastic member abutting between the second shaft and the second gear member, and constantly providing a second elastic force to the second gear member;
wherein the second elastic force provided by the second elastic member changes as the second panel body rotates about the second axis and drives the second gear member to rotate correspondingly and to slide along the second axis relative to the second stationary cam.

13. The foldable electronic device as claimed in claim 12, wherein the second gear member has a second motion cam, the second motion cam is fixed to the second gear and is adapted to assemble with the second stationary cam, and the second elastic member makes the second gear member tend to slide towards the second stationary cam.

14. The foldable electronic device as claimed in claim 13, wherein the second motion cam has a second sliding spiral surface, the second stationary cam has a second positioning spiral surface, and the second sliding spiral surface is slidably contacted with the second positioning spiral surface, and wherein as the second sliding spiral surface slides relative to the second positioning spiral surface and the second motion cam slides on the second shaft along the second axis and away from the second stationary cam, the second gear compresses the second elastic member.

15. The foldable electronic device as claimed in claim 14, wherein the second elastic member abuts between the second gear and the second connecting body, and wherein when the first panel body and the second panel body are in the folded state by the external force, the flexible screen is bent, and the second elastic member is compressed by the second gear, and when the external force is removed, the second elastic member is released so that the second motion cam slides axially toward the second stationary cam by the second elastic force, and thus the first panel body and the second panel body are converted to the unfolded state.

* * * * *